US012802083B2

(12) United States Patent
Werdell et al.

(10) Patent No.: US 12,802,083 B2
(45) **Date of Patent: *Nov. 17, 2026**

(54) CUSTOMER CARE TOPIC COVERAGE DETERMINATION AND COACHING

(71) Applicant: T-Mobile USA, Inc., Bellevue, WA (US)

(72) Inventors: Joel Werdell, Seattle, WA (US); Mark Hanson, Plano, TX (US); Heather Nolis, Seattle, WA (US); Maritza Ramirez, Boise, ID (US); James Ellison, Issaquah, WA (US)

(73) Assignee: T-Mobile USA, Inc.

( * ) Notice: Subject to any disclaimer, the term of this patent is extended or adjusted under 35 U.S.C. 154(b) by 51 days.

This patent is subject to a terminal disclaimer.

(21) Appl. No.: 18/898,596

(22) Filed: Sep. 26, 2024

(65) Prior Publication Data

US 2025/0021988 A1 Jan. 16, 2025

Related U.S. Application Data

(63) Continuation of application No. 17/370,844, filed on Jul. 8, 2021, now Pat. No. 12,131,334.

(51) Int. Cl.
*G06Q 30/016* (2023.01)
*G06F 40/40* (2020.01)
(Continued)

(52) U.S. Cl.
CPC ........... *G06Q 30/016* (2013.01); *G06F 40/40* (2020.01); *G06N 20/00* (2019.01); (Continued)

(58) Field of Classification Search
CPC ........... G06Q 30/016; G06Q 10/06398; G06Q 10/0633; G06F 40/30; G06F 9/453; G06N 20/00
(Continued)

(56) References Cited

U.S. PATENT DOCUMENTS 8,161,386 B1 4/2012 Mark
8,195,468 B2 6/2012 Weider et al.
(Continued)

FOREIGN PATENT DOCUMENTS

WO 2005122544 A1 12/2005
WO 2007106113 A2 9/2007
(Continued)

OTHER PUBLICATIONS

Galitsky, B. Chatbots for CRM and Dialogue Management. In: Artificial Intelligence for Customer Relationship Management. Human-Computer Interaction Series. Springer, Cham. https://doi.org/10.1007/978-3-030-61641-0_1. (Year: 2021).*

(Continued)

*Primary Examiner* — Rutao Wu
*Assistant Examiner* — Letoria G Knight

(57) ABSTRACT

A customer who is contacting customer care via a support session regarding a problem is classified into a customer category of multiple customer categories based at least on customer account information of the customer. A customer care topic in a predetermined set of multiple customer care topics that correspond to the problem is then identified via machine learning. A topic script that corresponds to the customer category of the customer for the customer care topic in the predetermined set of customer care topics is further retrieved or generated, in which the topic script includes one or more topic issues related to the customer care topics. The topic script is provided for presentation to a customer service representative (CSR) to prompt the CSR to discuss the one or more topic issues related to the customer care topic with the customer.

18 Claims, 9 Drawing Sheets

(51) Int. Cl.

| | |
|---|---|
| ***G06N 20/00*** | (2019.01) |
| ***G06Q 10/0639*** | (2023.01) |
| *G06Q 10/0631* | (2023.01) |
| *G06Q 10/10* | (2023.01) |
| *G06Q 30/0204* | (2023.01) |

(52) U.S. Cl.
CPC ................. *G06Q 10/06398* (2013.01); *G06Q 10/063114* (2013.01); *G06Q 10/10* (2013.01); *G06Q 30/0204* (2013.01)

(58) Field of Classification Search
USPC ................. 705/7.15, 304, 7.38, 7.27; 706/12
See application file for complete search history.

(56) References Cited

U.S. PATENT DOCUMENTS

| | | | |
|---|---|---|---|
| 8,634,537 B2 | 1/2014 | Hollatz et al. | |
| 8,706,498 B2 | 4/2014 | George | |
| 9,645,994 B2 | 5/2017 | Agarwal et al. | |
| 10,171,656 B2 | 1/2019 | Pullamplavil et al. | |
| 10,635,695 B2 | 4/2020 | Seth et al. | |
| 10,672,397 B2 | 6/2020 | Lee et al. | |
| 10,740,712 B2 | 8/2020 | Nies et al. | |
| 10,805,465 B1 | 10/2020 | Krebs et al. | |
| 10,880,435 B2 | 12/2020 | Fang et al. | |
| 10,896,428 B1 | 1/2021 | Balasubramaniam et al. | |
| 11,076,047 B1 | 7/2021 | Clodore et al. | |
| 11,144,846 B1 * | 10/2021 | Yannam | H04L 12/1818 |
| 11,163,875 B1 * | 11/2021 | Roundy | G06F 21/56 |
| 11,281,989 B2 * | 3/2022 | Dahlmeier | G06Q 10/0631 |
| 11,367,080 B2 | 6/2022 | Konig et al. | |
| 11,625,556 B1 | 4/2023 | Gaeta et al. | |
| 11,743,378 B1 | 8/2023 | Johnston et al. | |
| 11,900,300 B2 | 2/2024 | Ellison et al. | |
| 12,079,821 B2 | 9/2024 | Ellison et al. | |
| 12,112,338 B2 | 10/2024 | Ellison et al. | |
| 12,131,334 B2 | 10/2024 | Werdell et al. | |
| 2005/0149418 A1 | 7/2005 | Erbey et al. | |
| 2006/0080107 A1 | 4/2006 | Hill et al. | |
| 2014/0297268 A1 | 10/2014 | Govrin et al. | |
| 2015/0363393 A1 | 12/2015 | Williams et al. | |
| 2016/0189164 A1 | 6/2016 | Tolksdorf et al. | |
| 2017/0019315 A1 * | 1/2017 | Tapia | H04L 41/0631 |
| 2017/0163584 A1 | 6/2017 | Meng et al. | |
| 2018/0007102 A1 * | 1/2018 | Klein | H04L 65/612 |
| 2019/0034780 A1 | 1/2019 | Marin et al. | |
| 2019/0103111 A1 | 4/2019 | Tiwari et al. | |
| 2019/0191031 A1 | 6/2019 | O'Connor et al. | |
| 2019/0258714 A1 | 8/2019 | Zhong et al. | |
| 2020/0019893 A1 | 1/2020 | Lu | |
| 2020/0065857 A1 | 2/2020 | Lagi et al. | |
| 2020/0097563 A1 | 3/2020 | Alexander et al. | |
| 2020/0097814 A1 | 3/2020 | Devesa | |
| 2020/0134635 A1 | 4/2020 | Podgorny et al. | |
| 2020/0160351 A1 | 5/2020 | Veggalam et al. | |
| 2020/0242623 A1 | 7/2020 | Savir et al. | |
| 2020/0257996 A1 * | 8/2020 | London | G06F 40/58 |
| 2020/0258013 A1 * | 8/2020 | Monnett | H04L 41/5074 |
| 2020/0285699 A1 | 9/2020 | Nogima et al. | |
| 2020/0412868 A1 | 12/2020 | Jones et al. | |
| 2021/0004817 A1 | 1/2021 | Adibi et al. | |
| 2021/0004828 A1 | 1/2021 | Adibi et al. | |
| 2021/0073656 A1 | 3/2021 | Pan et al. | |
| 2021/0097552 A1 | 4/2021 | Meyer et al. | |
| 2021/0142791 A1 | 5/2021 | Penta et al. | |
| 2021/0157834 A1 * | 5/2021 | Sivasubramanian | G06F 16/686 |
| 2021/0203784 A1 | 7/2021 | Konig et al. | |
| 2021/0272584 A1 | 9/2021 | McAlpine et al. | |
| 2021/0342542 A1 | 11/2021 | James et al. | |
| 2022/0046129 A1 | 2/2022 | Clodore et al. | |
| 2022/0101186 A1 * | 3/2022 | Sharma Mittal | G06V 10/751 |
| 2022/0215323 A1 | 7/2022 | Dake et al. | |

FOREIGN PATENT DOCUMENTS

| | | |
|---|---|---|
| WO | 2015106171 A1 | 7/2015 |
| WO | 2018129389 A1 | 7/2018 |

OTHER PUBLICATIONS

Colette "A Mentor Program Improve Performance and Retention of Customer Service Representative", Sep. 2009, EPublications atRegis University, pp. 1-111 (Year: 2009).
Ehrens, "Customer Segmentation", Apr. 2019, https://www.Jechtarget.com/searchcustomerexperience/definition/Customer-segmentation (Year: 2019).
Garcia, C. "A Mentor Program Improve Performance and Retention of Customer Service Representative", Sep. 2009, ePublications atRegis University, pp. 1-111 (Year: 2009).
Lam, "Optimizing customer agent interactions with NLP and machine learning" URL: https://ieeexplore.ieee.org/document/8735616 (Year: 2019).
Lee, "Machine learning for enterprises" URL: https://www.sciencedirect.com/science/article/abs/pii/S0007681319301521via%3Dihub (Year: 2019).
U.S. Appl. No. 17/317,751, Notice of Allowance mailed Jun. 20, 2024, 21 pages.
U.S. Appl. No. 17/317,751, Office Action mailed Jan. 5, 2024, 21 pages.
U.S. Appl. No. 17/317,751, Office Action mailed Apr. 12, 2023, 67 pages.
U.S. Appl. No. 17/317,751, Final Office Action mailed Oct. 26, 2023, 29 pages.
U.S. Appl. No. 17/317,765, Final Office Action mailed Apr. 17, 2023, 29 pages.
U.S. Appl. No. 17/317,765, Notice of Allowance mailed May 8, 2024, 15 pages.
U.S. Appl. No. 17/317,765, Office Action mailed Oct. 4, 2022, 29 pages.
U.S. Appl. No. 17/317,765, Office Action mailed Oct. 5, 2023, 37 pages.
U.S. Appl. No. 17/345,355, Notice of Allowance mailed Oct. 18, 2023, 28 pages.
U.S. Appl. No. 17/345,355, Office Action mailed May 11, 2023, 34 pages.
U.S. Appl. No. 17/370,844, Final Office Action mailed Feb. 15, 2024, 43 pages.
U.S. Appl. No. 17/370,844, Office Action mailed Jul. 20, 2023, 49 pages.
U.S. Appl. No. 17/370,844, Notice of Allowance mailed Aug. 5, 2024, 28 pages.

* cited by examiner

CUSTOMER CARE TOPIC COVERAGE DETERMINATION AND COACHING

CROSS-REFERENCE TO RELATED APPLICATION

This application is a continuation of and claims priority under 35 U.S.C. § 120 to U.S. patent application Ser. No. 17/370,844 filed on Jul. 8, 2021, entitled "Customer Care Topic Coverage Determination and Coaching" by Joel Werdell, et al., which is incorporated herein by reference in its entirety for all purposes.

BACKGROUND

Mobile devices are integral to the daily lives of most users. Mobile devices are used to make voice calls, check email and text messages, update social media pages, stream media, browse websites, and so forth. As a result, users of mobile devices expect a wireless carrier network to provide constant and reliable telecommunication services at all times. The reliability of telecommunication and data communication services may be affected by multiple factors, such as geography and terrain, device features and capabilities, as well as network infrastructure and network coverage deployment. Additionally, users may also have questions or concerns regarding billing and payment for such telecommunication services. Thus, when users experience issues related to the wireless telecommunication services, the users may initiate calls or chat sessions with a customer care department of a wireless carrier network that provides such services.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
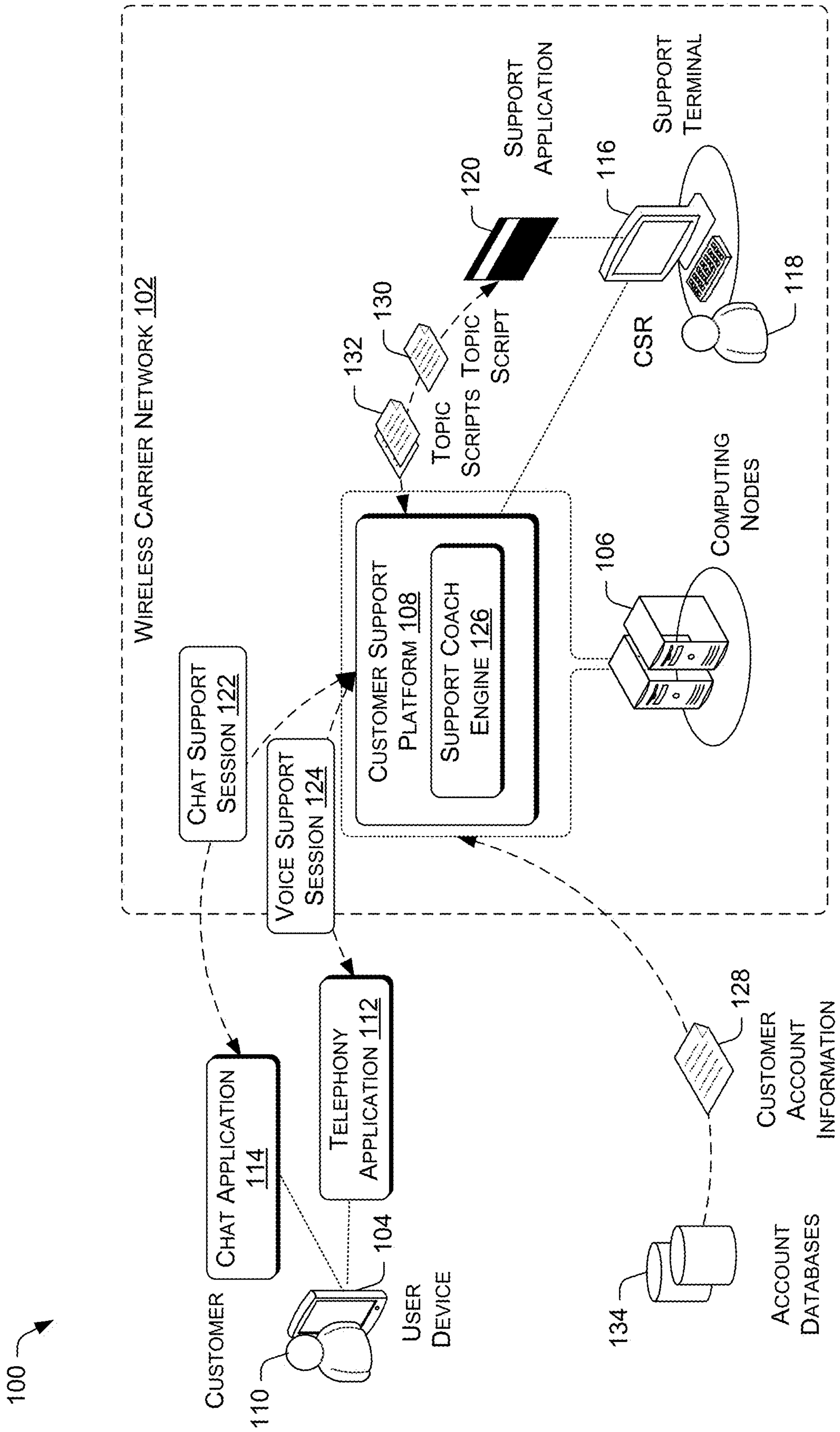
FIG. 1 illustrates an example architecture that provides customer care topic coverage determination and coaching to a customer service representative of a wireless carrier network.

This disclosure is directed to techniques for ensuring that a customer service representative (CSR) of a wireless carrier network addresses a predetermined set of multiple customer care topics with a customer, even when the customer contacts the customer care department of the wireless carrier network to discuss less than all of the multiple customer care topics. In various embodiments, when a customer initially contacts customer care, a support coach engine of the wireless carrier network may use a classification scheme to classify the customer into a customer category based on customer account information of the customer. The customer may contact customer care via a voice call session or a text chat session. A conversation topic identification algorithm is then used by the support coach engine to analyze the problem initially presented by the customer in the voice call session or the text chat session to classify the problem into one of the multiple customer care topics in the predetermined set. For example, in at least one instance, the predetermined set of multiple customer care topics may include a billing topic, a device topic, and a service topic.

Based on the customer category of the customer and the identified customer care topic for the problem, the support coach engine may retrieve or generate a corresponding script that guides the CSR in handling the concerns of the customer regarding the problem. The script may include a list of topic issues that the CSR is expected to cover, as well as recommended language for discussing each of the topic issues. The support coach engine may use a trained machine-learning algorithm to monitor the discussions of the CSR with the customer to ensure that all of the topic issues are covered. Alternatively, the CSR may be required to input a corresponding confirmation into an application user interface (e.g., click on a corresponding checkbox) after the CSR discusses each of the topic issues of the identified topic with the customer. Additionally, the support coach engine may use the application user interface to show the CSR the topic issue discussion progress as well as any topic issues of the predetermined set that are not yet discussed.

Once all the topic issues for the identified topic are discussed, the support coach engine may retrieve or generate corresponding scripts for the CSR to discuss additional customer care topics in the predetermined set of customer care topics until all customer care topics in the predetermined set are discussed. Further, the support coach engine may use the trained machine-learning algorithm or CSR inputted confirmation in the same manner to ensure that all of the topic issues of the additional topics are discussed by the CSR with the customer.

In some embodiments, each of the scripts for discussing the customer care topics may be a static script. However, in other instances, a trained machine-learning algorithm of the support coach engine may monitor the discussion of each customer care topic as the discussion progresses and dynamically change the list of topic issues to be discussed for each customer care topic. While each of the scripts contains recommended language units for discussing a topic issue, a rating algorithm may be used to provide an effectiveness rating associated with a language unit (e.g., a sentence or a paragraph) that is actually used by the CSR to discuss the topic issue in multiple support sessions. Thus, when the effectiveness rating associated with a language unit is above a predetermined rating threshold, the language unit may be incorporated into a script as the recommended language unit for discussing the topic issue.

The use of a support coach engine to ensure that a CSR discusses a predetermined set of customer care topics with a customer even when the customer contacts customer care of a wireless carrier network regarding less than all of the topics may significantly reduce the number of follow up voice call sessions or text chat sessions from the customer to customer care. For example, this may be due to additional problems faced by the customer being preemptively addressed in the same initial session. Accordingly, this approach may result in significant human, time, and infrastructure resource savings for the wireless carrier network. The techniques described herein may be implemented in a number of ways. Example implementations are provided below with reference to the following figures.

Example Architecture

FIG. 1 illustrates an example architecture 100 that provides customer care topic coverage determination and coaching to a customer service representative of a wireless carrier network. The wireless carrier network 102 may provide a wide range of mobile communication services, as well as ancillary services and features, to subscribers and associated mobile device users. In various embodiments, the wireless carrier network 102 may provide wireless communication between multiple user devices. Further, the wireless carrier network 102 may also provide communications between the multiple user devices, such as the user device 104, and other user devices that are serviced by other telecommunications networks. In various embodiments, the user devices may include mobile handsets, smartphones, tablet computers, personal digital assistants (PDAs), smartwatches, and/or electronic devices.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet-switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), CDMA-2000 (Code Division Multiple Access 2000), 5th Generation (5G), and/or so forth. In some embodiments, the core network of the wireless carrier network 102 may be accessed via wired or wireless local area networks (LANs). For example, a wireless local area network may be a network that is established using Wi-Fi or Bluetooth standards and hardware.

A RAN of the wireless carrier network 102 may include a number of base stations, which are also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network. The core network may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network. The core network may connect to a public packet data communication network, such as the Internet, via one or more gateways. Accordingly, data and voice communications via the RANs, the core network, and the Internet may support a variety of telecommunication services through the wireless carrier network 102. The core network may include one or more computing nodes 106 that support a customer support platform 108.

The customer support platform 108 may route incoming support requests from customers with service issues to CSRs of the wireless carrier network 102. In various embodiments, the customers may initiate the support requests via voice calls or online chat session messages. For example, a customer 110 may use a telephony application 112 on the user device 104 to place a telephone support call to a customer care phone number of the wireless carrier network 102. Alternatively, the customer 110 may use a chat application 114 on the user device 104 to initiate a support chat session request to the customer support platform 108. The chat application 114 may be a standalone application or part of a customer support application that is provided to the customer 110 by the wireless carrier network 102. In at least one embodiment, the telephony application 112 or the chat application 114 may exchange data with the customer support platform 108 via the wireless carrier network 102, the Internet, a local area network (LAN), a wide area network (WAN), and/or some other network. In turn, the customer support platform 108 may route the incoming support request from the user device 104 to a support terminal of an available CSR, such as a support terminal 116 of a CSR 118, so that a support session may be initiated between the CSR and the customer 110.

The CSR 118 may engage in a support session with the customer 110 via a support application 120 on the support terminal 116. In instances in which the support session is a chat support session 122, the CSR 118 may use a chat function of the support application 120 to exchange text communications with the customer 110. Alternatively, if the support session is a voice call, the CSR 118 may use a telephony function of the support application 120, as well as peripheral audio input and output hardware connected to the support terminal 116, (e.g., a headset) to talk with the customer 110.

In various embodiments, the customer support platform 108 may include a support coach engine 126 that assists and coaches CSRs to provide customer support to the customer. For example, once the customer support platform 108 receives the support request initiated from the user device 104, the support coach engine 126 may retrieve customer account information 128 of the customer 110 from account databases 134 of the wireless carrier network 102. Subsequently, the customer support platform 108 may use a classification scheme to classify the customer 110 into a customer category of multiple customer categories based on customer account information 128 of the customer 110.

Further, following the initial input of a problem by the customer 110 via the chat support session 122 or the voice support session 124, the support coach engine 126 may use a conversation topic identification algorithm to analyze the problem and classify the problem into one customer care topic in a predetermined set of the multiple customer care topics. For example, in at least one instance, the predetermined set of multiple customer care topics may include a billing topic, a device topic, and a service topic.

Based on the customer category of the customer and the identified customer care topic for the problem, the support coach engine 126 may retrieve or generate a corresponding topic script 130 that guides the CSR 118 in handling the concerns of the customer 110 regarding the problem. In various embodiments, the topic script may include a list of topic issues that the CSR is expected to cover, as well as recommended language units for discussing each of the topic issues. In some embodiments, the topic script 130 may be a static script that is retrieved from a script database. However, in other embodiments, the support coach engine 126 may use a trained machine-learning algorithm to monitor the discussion of the customer care topic as the discussion progresses and dynamically change the list of topic issues to be presented via the topic script 130.

In some instances, the support coach engine 126 may use a trained machine-learning algorithm to monitor the discussions of the CSR 118 with the customer 110 to ensure that all of the topic issues in the topic script 130 are covered. In alternative instances, the CSR 118 may be required to input a corresponding confirmation into an application user interface provided by the support coach engine 126 and presented by the support application 120 (e.g., click on a corresponding checkbox) after the CSR 118 discusses each of the topic issues of the identified topic in the topic script 130 with the customer. Additionally, the support coach engine 126 may use the application user interface to show the CSR 118 the topic issue discussion progress as well as any topic issues of the predetermined set that are not yet discussed.

Once all the topic issues for the identified topic are discussed according to the topic script 130, the support coach engine 126 may retrieve or generate corresponding topic scripts 132 for the CSR 118 to discuss additional customer care topics in the predetermined set of customer care topics in succession. Further, the support coach engine 126 may use the trained machine-learning algorithm or CSR inputted confirmation in the same manner to ensure that all of the topic issues of the additional topics are discussed by the CSR with the customer. Additionally, a separate algorithm may be used to monitor the discussions between the CSR 118 and the customer 110 to detect whether the CSR 118 has discussed all of the customer care topics in the predetermined set of customer care topics with the customer 110. Accordingly, the support coach engine 126 may use an application user interface to present a topic discussion status to the CSR 118, such that the application user interface may provide a status notification in the event that the CSR 118 attempts to terminate the support session without discussing all the topics.

Example Support Coach Engine Components

Figure 2:
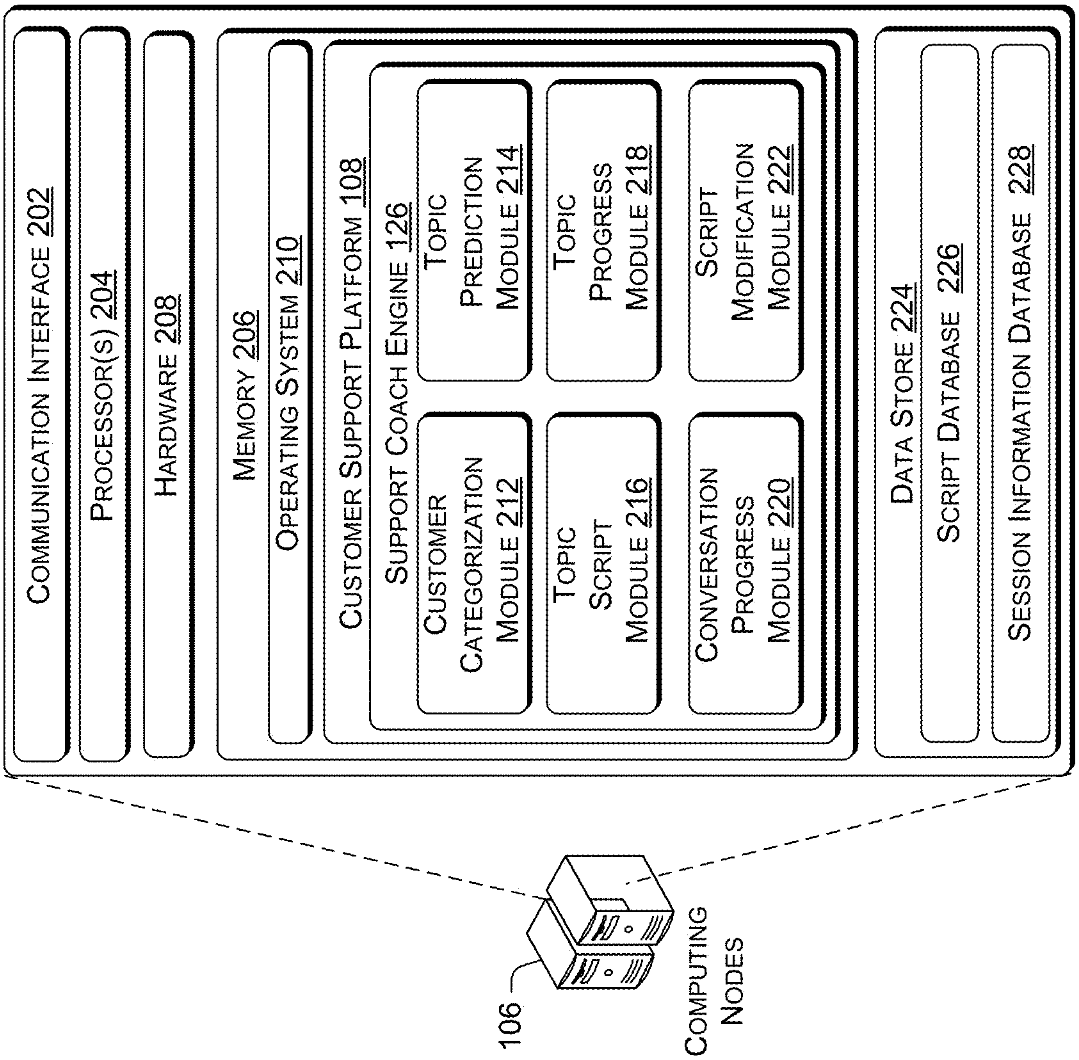
FIG. 2 is a block diagram showing various components of a support coach engine that provides customer care topic coverage determination and coaching to a customer service representative of a wireless carrier network.

FIG. 2 is a block diagram showing various components of a support coach engine that provides customer care topic coverage determination and coaching to a customer service representative of a wireless carrier network. The computing nodes 106 may provide a communication interface 202, one or more processors 204, memory 206, and hardware 208. The communication interface 202 may include wireless and/or wired communication components that enable the devices to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 206 of the computing nodes 106 may implement an operating system 210. In turn, the operating system 210 may provide an execution environment for the customer support platform 108. The operating system 210 may include components that enable the computing nodes 106 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The support coach engine 126 of the customer support platform 108 may include a customer categorization module 212, a topic prediction module 214, a topic script module 216, a topic progress module 218, a conversation progress module 220, and a script modification module 222. The modules may include routines, program instructions, objects, and/or data structures that perform particular tasks or implement particular abstract data types. The memory 206 may also include a data store 224 that is used by the customer support platform 108.

The customer categorization module 212 may categorize a customer based on customer account information retrieved from one or more account databases 134 of the wireless carrier network 102. For example, an incoming support request initiated at a user device and received by at the customer support platform 108 may be tagged with a customer identifier, such as a telephone number (e.g., a Mobile Station International Subscriber Directory Number (MSISDN)), an International Mobile Subscriber Identities (IMSI), a customer account number, and/or some other customer identifier. Accordingly, the customer categorization module 212 may use the customer identifier to retrieve the corresponding customer account information from the one or more account databases 134. In some instances, the customer categorization module 212 may use data adaptors to retrieve data from the databases of the data sources. For example, the customer categorization module 212 may use data-agnostic data adaptors to access unstructured databases, and/or database-specific data adaptors to access structured databases.

The customer account information for the customer may include information such as whether the customer is a primary account holder, account type information (e.g., pre-paid vs. postpaid), veteran status, employment information, payment history, account balance information, data consumed for each time period, minutes of talk time used for each time period, customer demographic information, and/or so forth. Accordingly, the customer categorization module may use a classification scheme to analyze the customer account information of the customer to classify the customer into a customer category of multiple customer categories. For example, in at least one implementation, the multiple customer categories may include a senior customer category, a first responder customer category, a military customer category, a postpaid customer category, etc. The senior customer category may include customers of the wireless carrier network 102 who are over the age of 55. The first responder customer category may include customers of the wireless carrier network 102 who are verified members of first responder organizations and agencies. The military customer category may include customers of the wireless carrier network 102 who are verified members of the military. The postpaid customer category may include customers of the wireless carrier network 102 with postpaid accounts. The customers in each of the customer categories may be eligible for certain corresponding discounts and/or specific corresponding wireless service plans.

The topic prediction module 214 may use a conversation topic identification algorithm to analyze a problem initially inputted by a customer via a chat support session or a voice support session to classify the problem as being associated with a particular customer care topic in a predetermined set of the multiple customer care topics. In instances in which the problem is inputted as text via a chat support session, the topic prediction module 214 may apply a natural language processing (NLP) algorithm to the text provided via the chat support session. The NLP algorithm may use techniques such as morphological segmentation, part-of-speech tagging, word segmentation, named entity recognition (NER) to parse the language contained in the text into speech entities that include semantics, concepts, nouns, etc. Subsequently, the topic prediction module 214 may apply the topic identification algorithm to the speech entities to classify the speech entities as being related to a particular customer care topic. In instances in which the problem is inputted via a chat support session, the topic prediction module 214 may use a speech-to-text algorithm to transform spoken speech into text before applying the NLP algorithm and the topic identification algorithm to the problem included in the spoken speech. In some instances, the topic identification algorithm of the topic prediction module 214 may be a machine-learning algorithm.

The topic script module 216 may use a particular customer category and a particular customer care topic identified for a support session requested by a customer to retrieve a corresponding topic script from a scripts database 226 as stored in the data store 224. For example, if the particular customer category identified is the postpaid customer category, and the customer care topic identified is the billing topic, the topic script module 216 may retrieve a topic script from the scripts database 226 that is specific to the combination of the postpaid customer category and the billing topic. The scripts database 226 may include different topic scripts that correspond to different combinations of customer categories and customer care topics. Accordingly, the topic script module 216 may present the retrieved topic script to a CSR that is assigned to assist the customer via the support session. The retrieved topic script may be presented to the CSR via an application user interface of a support application used by the CSR. In some embodiments, the retrieve topic script may be a static script that includes a list of topic issues that the CSR is expected to cover with the customer. For each of the topic issues, the topic script may include recommended language units for discussing each of the topic issues.

In other embodiments, the topic script module 216 may use a dynamically generated script instead of a static script. The dynamic script as retrieved from the script database 226 may initially include a baseline list of topic issues. The baseline list of topic issues may include one or more identical topic issues that are covered by a corresponding static script. However, the topic script module 216 may include a topic discussion function that monitors and analyzes the discussions between the CSR and the customer. For example, the topic discussion function may use NLP and/or speech-to-text techniques to extract words or phrases used during the discussion. Based on the content of the discussion, the topic discussion function may determine contextual information for the discussion and add topic issues to or remove topic issues from the baseline list of topic issues based on the contextual information. For example, if the topic discussion function detects that a particular topic issue to be discussed is already covered or is rendered irrelevant by a discussion of another topic issue by the CSR with the customer, the topic analysis algorithm may modify the topic script by removing the particular topic issue from the topic script. In another example, if the topic discussion function detects that a discussion of a particular topic issue by the CSR with the customers make another topic issue which was not previously in the dynamic script relevant to a problem experienced by the customer, the topic analysis function may add the topic issue to the topic script. The topic analysis function may retrieve information related to the topic issue, include the recommended language units for discussing the topic issue from the script database 226 and append the information to the dynamic script for presentation to the CSR. In at least one embodiment, the topic analysis function of the topic script module 216 may use a machine-learning algorithm to analyze the discussions between the CSR and the customer.

As further described below, the topic script module 216 may be prompted by the topic progress module 218 to present a status notification when the topic progress module 218 determines that the CSR is terminating the discussion of a particular customer care topic with the customer without discussing all of the topic issues. The status notification may be presented via an application user interface of the support application used by the CSR. The status notification may indicate that a discussion of a specific customer care topic with the customer topic is complete. The status notification may include information on one or more specific topic issues of the particular customer care topic that are not yet discussed.

Additionally, the conversation progress module 220 may prompt the topic script module 216 to successively provide additional topic scripts that match the particular customer category of the customer, but that are for other customer care topics in a predetermined set of customer care topics until all of the customer care topics in the predetermined set of customer care topics are discussed. Furthermore, the topic script module 216 may be prompted by the conversation progress module 220 to present a status notification when the conversation progress module 220 determines that the CSR is attempting to terminate the support session without covering all the customer care topics with the customer. The status notification may be presented via an application user interface of the support application used by the CSR. The status notification may indicate that a discussion of the predetermined set of customer care topics is complete. The status notification may include information on one or more specific customer care topics of the predetermined set of customer care topics that are not yet discussed.

The topic progress module 218 may provide an application user interface that enables the CSR to manually indicate to the topic progress module 218 that the CSR has discussed each topic issues of a customer care topic. The checklist may be presented in conjunction with the recommended language units for discussing one or more of the topic issues. In some embodiments, the topic progress module 218 may generate a checklist of topic issues based on issue information in the corresponding topic script for the customer care topic. In one implementation, each of the topic issues in the checklist is provided with a corresponding data input field (e.g., a corresponding checkbox) that enables the CSR to indicate to the topic progress module 218 that the topic issue has been discussed. In some instances, the CSR may be authorized to indicate that a topic issue is discussed when the customer declines to discuss the topic issue further after the topic issue is brought up by the CSR. Once the CSR has used the checklist to indicate that all of the topic issues for a customer care topic has been discussed with the customer, the topic progress module 218 may notify the conversation progress module 220 that the customer care topic has been discussed, and request an indication from the conversation progress module 220 as to whether there are additional customer care topics of the predetermined set that the CSR has not yet discussed with the customer. In turn, the conversation progress module 220 may store the information regarding the topic discussion status for the customer in a session information database 228. The discussion status information of the customer may be indexed in the session information database 228 by a customer identifier of the customer. In some instances, the session information database 228 may further store the time and date information for each discussion event of each customer, one or more problems discussed at each discussion event, a text transcript of the discussion, and/or so forth. Thus, if the conversation progress module 220 provides an indication of a next customer care topic of the predetermined set that has not yet been discussed by the CSR with the customer, the topic progress module 218 may retrieve and serve up a topic script for the next customer care topic that has not yet been discussed from the scripts database 226. However, if the conversation progress module 220 indicates that all customer care topics in the predetermined set are discussed, the topic progress module 218 may take no further action. Instead, the conversation progress module 220 may present a confirmation on the application user interface to the CSR indicating that all of the customer care topics are covered. The confirmation may further notify the CSR that it is appropriate to terminate the support session with the customer.

In alternative embodiments, the topic progress module 218 may use a topic monitor function to analyze the discussion between the CSR and the customer to automatically determine whether all the topic issues of a current customer care topic have been discussed without any manual input. For example, the topic monitor function may use NLP and/or speech-to-text techniques to extract words or phrases used during the discussion. The topic monitor function may include a machine-learning algorithm that performs the analysis. In such embodiments, the topic monitor function may analyze the discussions to automatically check off topic issues as being discussed as well as to detect that the CSR is moving to a different customer care topic without discussing all topic issues of a current customer care topic. For example, when the CSR uses certain words or phrases that are configured in a topic script as being associated with a particular topic issue in a communication with the customer, the topic monitor function may determine that the topic issue is discussed. In another example, when the current customer care topic is billing and the CSR starts to mention words or phrases related to device features and/or functionalities of a user device, the topic monitor function may determine that the CSR is moving to a different customer topic without having completed the discussion of all topic issues of the current topic. In such an instance, the topic progress module 218 may present a status notification via the application user interface. The status notification may indicate to the CSR that the discussion of the current customer care topic is incomplete. The status notification may further include a list of undiscussed topic issues. On occasions in which the CSR fails to discuss the list of undiscussed topic issues within a predetermined time period of the status notification or in which the CSR eventually terminates the support session without ever discussing the list of topic issues, the topic progress module 218 may record such deficiencies with respect to the support session for the customer in the session information database 228. In at least one additional embodiment, the topic progress module 218 may be configured so that the CSR may use an application user interface to indicate to the conversation progress module 220 that the customer declined to discuss one or more topic issues of a customer care topic. The CSR may input this indication when the topic progress module 218 determines and notifies the CSR that less than all of the topic issues of a customer care topic were discussed with the customer.

The conversation progress module 220 may function to ensure that all of the customer care topics in the predetermined set are discussed by the CSR with the customer in a support session before the termination of the support session. For example, the conversation progress module 220 may use NLP and/or speech-to-text techniques to extract words or phrases used during the discussion. In some embodiments, the conversation progress module 220 may use a keyword detection function to determine whether the CSR is ending, i.e., terminate a support session with a customer based on one or more keywords or phrases used by the CSR during the support session. For example, if the keyword detection function detects the CSR using the phrase “Is there anything else I can do for you” or the phrase “do you have any other concerns”, the keyword detection function may determine that the CSR is ending the support session. Subsequently, the conversation progress module 220 may access the discussion status information of the customer in the session information database 228 to determine whether all of the customer care topics in the predetermined set have been discussed. Thus, if all the customer care topics are covered, the conversation progress module 220 may present a confirmation on the application user interface to the CSR indicating that all of the customer care topics are covered. The confirmation may further notify the CSR that it is appropriate to terminate the support session with the customer. On an occasion in which the CSR terminates the support session without discussing all of the topics, the conversation progress module 220 may record such an occurrence with respect to the support session for the customer in the session information database 228.

In other embodiments, the conversation progress module 220 may use a machine-learning function to detect that a CSR is ending a support session. In various embodiments, the machine-learning function may use contextual characteristics of communications exchanged by the CSR and the customer during a support session to arrive at a conclusion that the CSR is ending the support session. The contextual characteristics may include combinations of words or phrases, detected tone or inflection in speech spoken by the CSR and/or the customer during a chat support session, and/or so forth. A combination of words or phrases may include words or phrases used by the CSR during the support session and/or used by the customer during the support session. In at least one additional embodiment, the conversation progress module 220 may be configured so that the CSR may use an application user interface to indicate to the conversation progress module 220 that the customer declined to discuss one or more customer care topics. The CSR may input this indication when the conversation progress module 220 determines and notifies the CSR that less than all of the customer care topics in the predetermined set were discussed with the customer.

The script modification module 222 may use the effectiveness ratings of support sessions to determine whether novel language units used by a CSR in the support sessions are to be used as recommended language units for discussing topic issues. In various embodiments, the script modification module 222 may derive an effectiveness rating for the multiple support sessions that are provided by the CSR based on feedback for the multiple support sessions. The multiple support sessions may be support sessions from a predetermined period of time (e.g., a week, a month, six months, etc.). In some instances, the feedback may include results from customer satisfaction ratings that are submitted by customers using an online portal, such as via an online customer survey website. For the customer satisfaction ratings, each customer may input a number of points awarded out of a predetermined maximum set of points for a support session, in which more points are awarded for greater customer satisfaction with the assistance received during a support session. A rating algorithm of the script modification module 222 may calculate an average effectiveness rating for the multiple support session. Alternatively, or concurrently, the feedback may include a callback rating for the support sessions handled by the CSR. For example, the rating algorithm may award the CSR a specific predetermined number of points for each support session in which a customer did not contact customer care regarding the same problem within a predetermined period of time, or subtract a particular number of points for each support session in which the customer contacted customer regarding the same problem within the predetermined period of time. The rating algorithm may make such determinations based on information stored in the session information database 228. Accordingly, the rating algorithm may generate an average effectiveness rating by averaging the total number of points awarded or subtracted over the number of support sessions. In some embodiments, the rating algorithm may generate an overall effectiveness rating for the multiple sessions handled by a CSR by combining the effectiveness ratings that are derived from multiple types of feedback sources. For example, the amalgamated effectiveness rating may be an average, a sum, a difference, or some other mathematical combination of effectiveness rating derived from the multiple types of feedback sources.

The script modification module 222 may analyze the language units that are used in the multiple support sessions of a particular CSR when the effectiveness rating of the multiple support sessions exceeds a predetermined rating threshold. Such analysis may be performed using text transcripts of the discussions that occurred during the support sessions, in which the text transcripts are recorded by a transcript recording function of the customer support platform 108. Each of the text transcripts may be labeled with information such as a customer identifier of the corresponding customer, a CSR identifier the CSR, a discussion start time/date, a discussion end time/date, metadata markers that correspond to discussion segments for different customer care topics and/or different topic issues, etc. The analysis may include analyzing the text transcripts of the support sessions to determine a most common language unit (e.g., a phrase, a sentence, a paragraph, etc.) that the CSR used in discussing each topic issue of a customer care topic. Each of the most common language units is then compared by the script modification module 222 to the corresponding recommended language in a topic script for the topic issue to determine whether the language unit differs from the recommended language. For example, a content similarity detection algorithm may be used by the script modification module 222 to generate a dissimilarity score between the language unit used and the recommended language that indicates a degree of difference. The content similarity detection algorithm may use a fingerprinting technique, a string-matching technique, a bag of words analysis technique, and/or so forth, to generate the dissimilarity score. Thus, if the dissimilarity score exceeds a dissimilarity score threshold, the script modification module 222 may determine that the language unit differs from the recommended language. Subsequently, the script modification module 222 may replace the recommended language in the topic script with the language unit so that the language unit becomes the recommended language for discussion of the topic issue in future discussions between CSRs and customers. However, if the dissimilarity score does not exceed a dissimilarity score threshold, the script modification module 222 may disregard the language unit. In other embodiments, the script modification module 222 may receive manual inputs of language changes to the recommended language for the discussion of a topic issue. Such manual inputs may be provided by a customer care management member following human evaluation of the various language units used by different CSRs with effectiveness ratings that exceed the predetermined rating threshold.

The various machine-learning algorithms used by the modules of the support coach engine 126 may be trained via a model training algorithm. The model training algorithm may implement a training data input phase, a feature engineering phase, and a model generation phase. In the training data input phase, the model training algorithm may receive training datasets. For example, the topic script module 216 may use training datasets that include a combination of language expressions, billing data, account status data, device diagnostic data, relevant network data, and/or relevant contextual data that are labeled with corresponding topic issues. In another example, the topic progress module 218 may use training datasets that include words, phrases, sentences, paragraphs that are labeled as related to specific topic issues.

In an additional example, the conversation progress module 220 may use training datasets that include words, phrases, sentences, paragraphs, as well as other communication characteristics that are labeled as related to conversation ending cues. The individual training datasets may include datasets that are generated based on prior customer support interactions. During the feature engineering phase, the model training algorithm may pinpoint features in the training data. Accordingly, feature engineering may be used by the model training algorithm to figure out the significant properties and relationships of the input datasets that aid a machine learning model to distinguish between different classes of data. During the model generation phase, the model training algorithm may select an initial type of machine learning algorithm to train a machine learning model using the training data. Following the application of a selected machine learning algorithm to the training data, the model training algorithm may determine a training error measurement of the machine learning model. If the training error measurement exceeds a training error threshold, the model training algorithm may use a rule engine to select a different type of machine learning algorithm based on a magnitude of the training error measurement. The different types of machine learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and the trained machine learning model is generated.

Example Application User Interface

Figure 3:
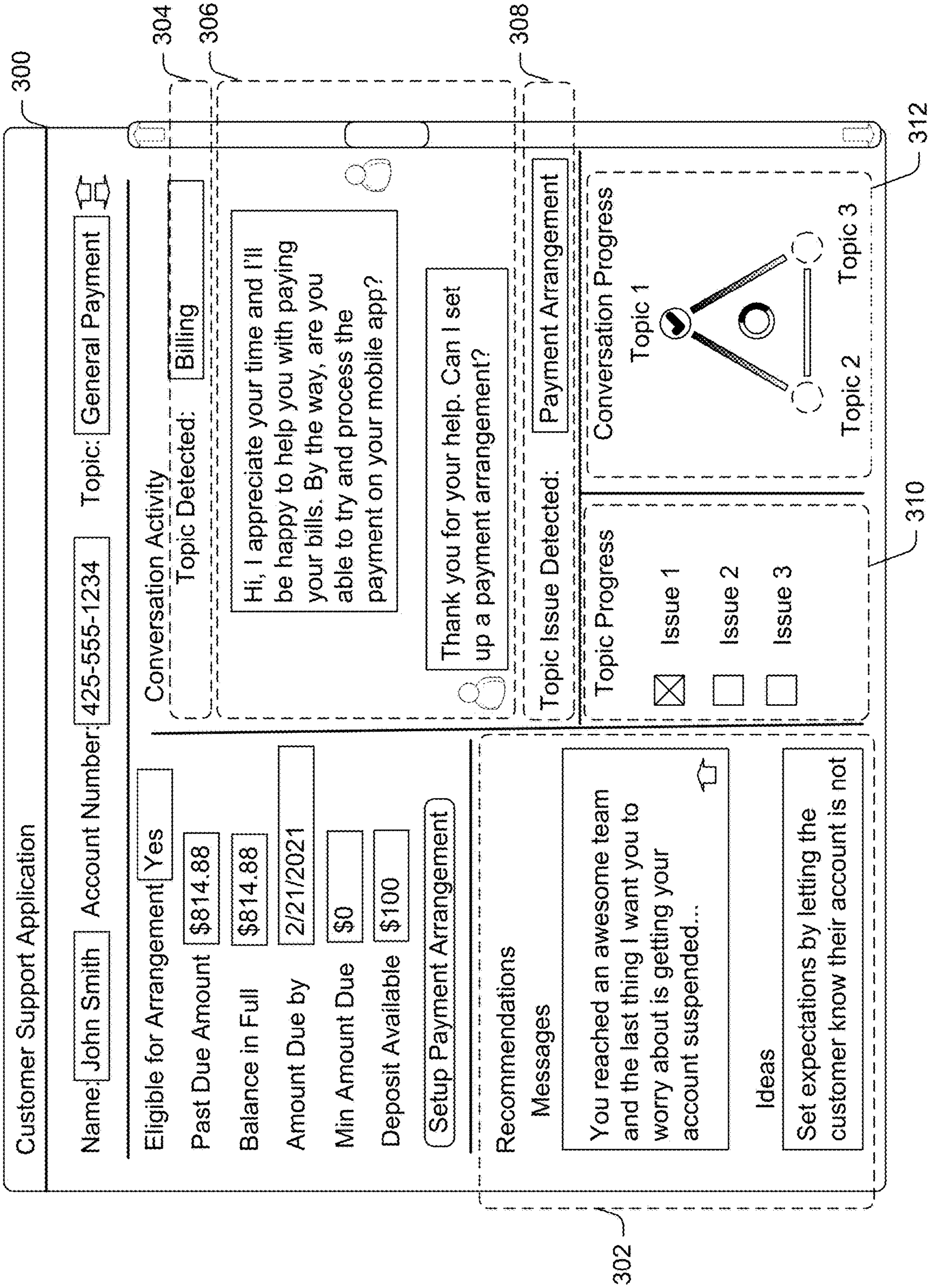
FIG. 3 shows an example application user interface used by a support coach engine to assist a customer service representative in providing customer support to a customer.

FIG. 3 shows an example application user interface 300 used by a support coach engine to assist a customer service representative in providing customer support to a customer. The application user interface 300 may include a recommended language section 302, a detected topic section 304, a chat section 306, a detected topic issue section 308, a topic progress section 310, and a conversation progress section 312. The recommended language section 302 may display the recommended language for use by a CSR to discuss a current topic issue with a customer. In addition to the actual recommended language, the recommended language section 302 may further display general ideas for communicating with the customer with respect to the current topic issue. In various embodiments, the recommended language section 302 may dynamically present recommended language for various issue topics as the CSR discusses different issue topics with the customer.

The detected topic section 304 may display a topic of the predetermined set of customer care topics that is detected as being currently discussed by the CSR with the customer. The detection may be performed by a machine-learning algorithm based on the language used in the chat conversation between the CSR and the customer. The chat section 306 may display the chat conversation between the CSR and the customer. The chat conversion as displayed in the chat section 306 may continue until all of the customer care topics in the predetermined set are discussed by the CSR with the customer. The detected topic issue section 308 may display a topic issue that is detected as being currently discussed by the CSR with the customer. The detection may be performed by a machine-learning algorithm of the support coach engine 126. based on the language used in the chat conversation between the CSR and the customer. The topic progress section 310 may display the progress of the CSR in discussing topic issues of a topic with the customer. The discussion progress with respect to the topic issues may be monitored by a machine-learning algorithm of the support coach engine 126. However, in alternative embodiments, the topic progress section 310 may include user input controls (e.g., checkboxes) that enable the CSR to indicate that various topic issues of a current topic have been discussed. The conversation progress section 312 may display the progress of the CSR in discussing various customer care topics of the predetermined set with the customer. The discussion progress with respect to the customer care topics may be monitored by a machine-learning algorithm the support coach engine 126.

Example Processes

FIGS. 4*a*-8 present illustrative processes 400-800 that may be implemented to provide customer care topic coverage determination and coaching to a customer service representative of a wireless carrier network. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4A:
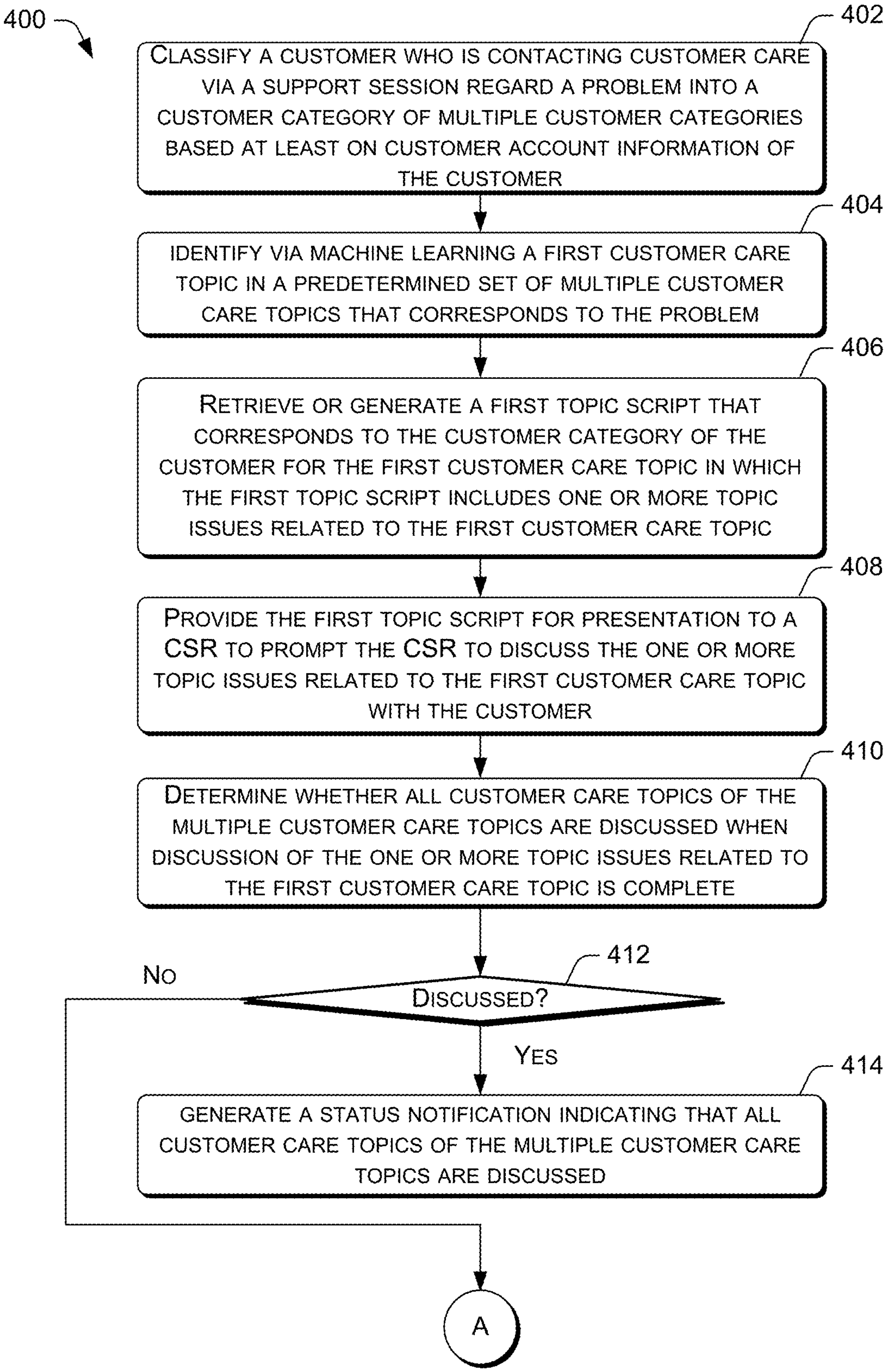
FIGS. 4*a-b* are a flow diagram of an example process used by a support coach engine to ensure that a predetermined set of multiple customer care topics are covered by a customer service representative.
Figure 4B:
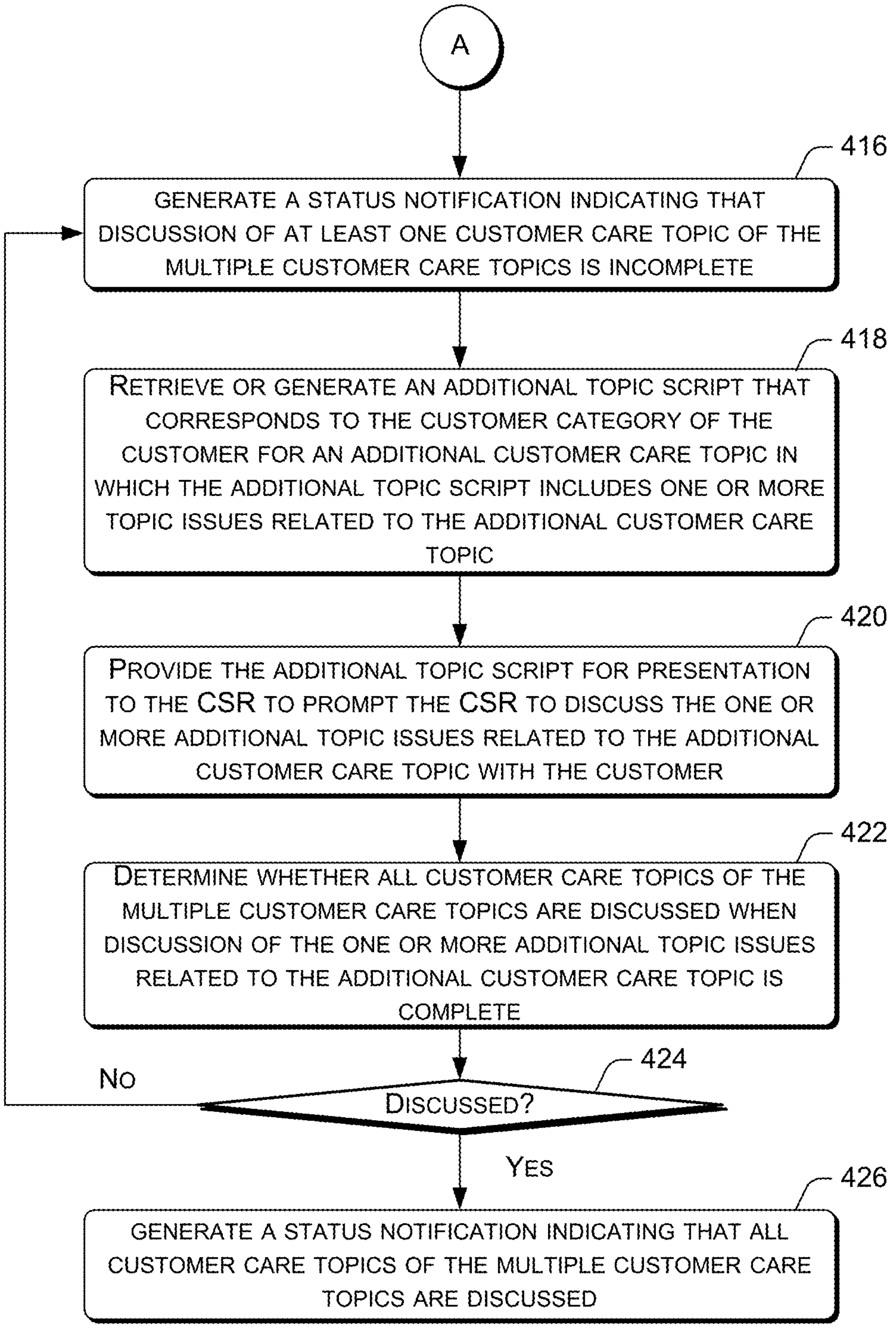

FIGS. 4*a*-*b* are a flow diagram of an example process 400 used by a support coach engine to ensure that a predetermined set of multiple customer care topics are covered by a customer service representative. At block 402, the support coach engine 126 may classify a customer who is contacting customer care via a support session regarding a problem into a customer category of multiple customer categories based at least on customer account information of the customer. The customer account information for the customer may include information such as whether the customer is a primary account holder, account type information (e.g., pre-paid vs. postpaid), veteran status, employment information, payment history, account balance information, data consumed for each time period, minutes of talk time used for each time period, customer demographic information, and/or so forth.

At block 404, the support coach engine 126 may identify via machine-learning a first customer care topic in a predetermined set of multiple customer care topics that correspond to the problem. The support coach engine 126 may apply a topic identification algorithm to speech entities or text initially provided by the customer at the beginning of the support session to classify the speech entities as being related with a particular customer care topic.

At block 406, the support coach engine 126 may retrieve or generate a first topic script that corresponds to the customer category of the customer for the first customer care topic in which the first topic script includes one or more topic issues related to the first customer care topic. At block 408, the support coach engine 126 may provide the first topic script for presentation to a CSR to prompt the CSR to discuss the one or more topic issues related to the first customer care topic with the customer.

At block 410, the support coach engine 126 may determine whether all customer care topics of the multiple customer care topics are discussed when discussion of the one or more topic issues related to the first customer care topic is complete. At decision block 412, if all the customer care topics are discussed ("yes" at decision block 412), the process 400 may proceed to block 414. At block 414, the support coach engine 126 may generate a status notification indicating that all customer care topics of the multiple customer care topics are discussed. The status notification may be generated for presentation to the CSR via a support application on a support terminal. However, if not all the customer care topics are discussed ("no" at decision block 412), the process 400 may proceed to block 416.

At block 416, the support coach engine 126 may generate a status notification indicating that discussion of at least one customer care topic of the multiple customer care topics is incomplete. The status notification may be generated for presentation to the CSR via a support application on a support terminal. At block 418, the support coach engine 126 may retrieve or generate an additional topic script that corresponds to the customer category of the customer for an additional customer care topic in which the additional topic script includes one or more topic issues related to the additional customer care topic. At block 420, the support coach engine 126 may provide the additional topic script for presentation to the CSR to prompt the CSR to discuss the one or more additional topic issues related to the additional customer care topic with the customer. At block 422, the support coach engine 126 may determine whether all customer care topics of the multiple customer care topics are discussed when discussion of the one or more additional topic issues related to the additional customer care topic is complete.

At block 422, the support coach engine 126 may determine whether all customer care topics of the multiple customer care topics are discussed when discussion of the one or more topic issues related to the additional customer care topic is complete. At decision block 424, if all the customer care topics are discussed ("yes" at decision block 424), the process 400 may proceed to block 426. At block 426, the support coach engine 126 may generate a status notification indicating that all customer care topics of the multiple customer care topics are discussed. The status notification may be generated for presentation to the CSR via a support application on a support terminal. However, if not all the customer care topics are discussed ("no" at decision block 424), the process 400 may loop back to block 416.

Figure 5:
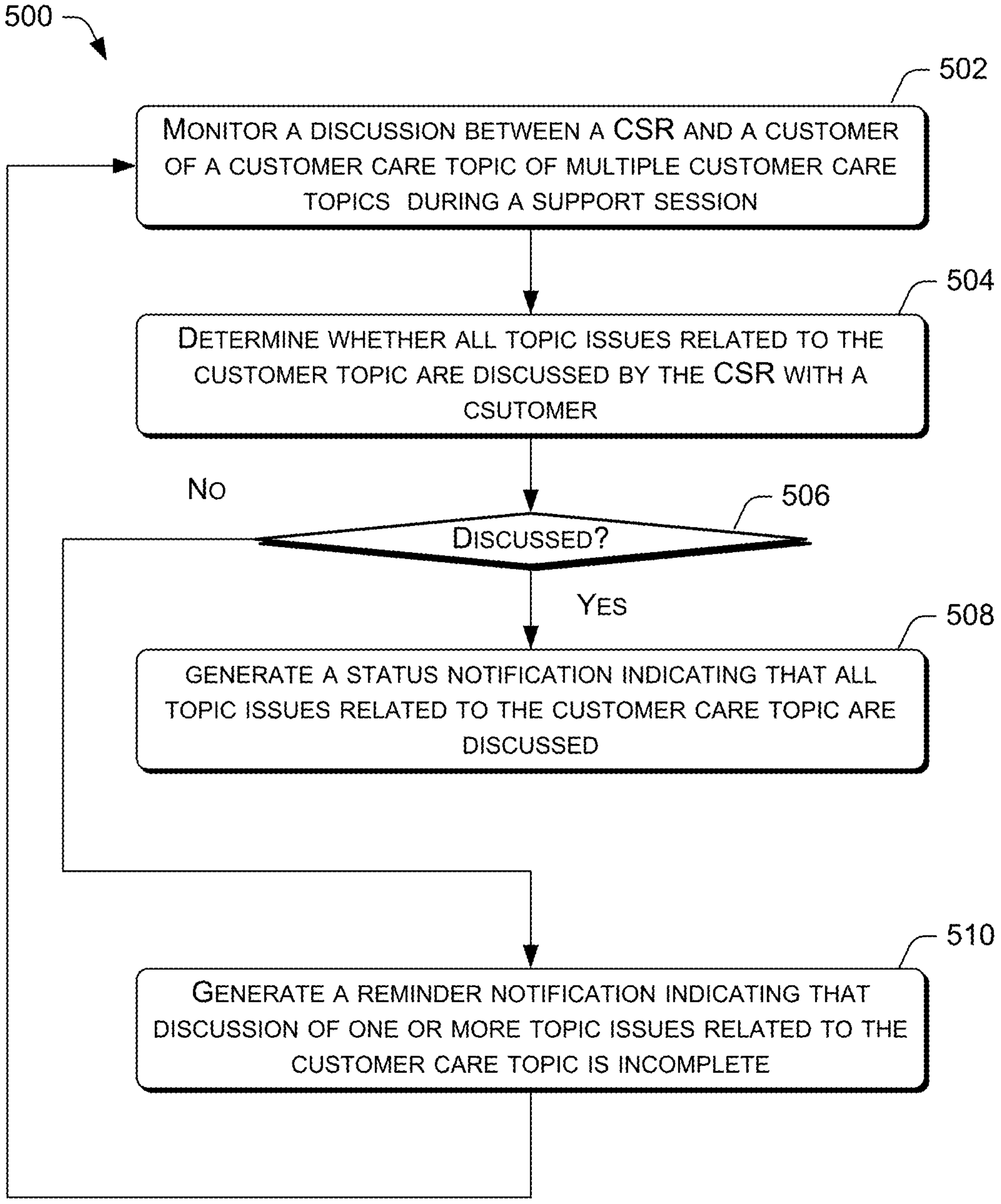
FIG. 5 is a flow diagram of an example process used by a support coach engine to ensure that all topic issues related to a customer care topic are discussed by a customer service representative with a customer.

FIG. 5 is a flow diagram of an example process 500 used by a support coach engine to ensure that all topic issues related to a customer care topic are discussed by a customer service representative with a customer. At block 502, the support coach engine 126 may monitor a discussion between a CSR and a customer of a customer care topic of multiple care topics during a support session. In various embodiments, the support coach engine 126 may use NLP and/or speech-to-text techniques to extract words or phrases used during the discussion. At block 504, the support coach engine 126 may determine whether all topic issues related to the customer topic are discussed by the CSR with a customer. In some embodiments, the support coach engine 126 may provide an application user interface that enables the CSR to manually indicate to the topic progress module 218 that the CSR has discussed each topic issues of a customer care topic. In other embodiments, the support coach engine 126 may use a topic monitor function to analyze the discussion between the CSR and the customer to automatically determine whether all the topic issues of a current customer care topic have been discussed without any manual input.

At decision block 506, if the support coach engine 126 determines that all topic issues are discussed ("yes" at decision block 506), the process 500 may proceed to block 508. At block 508, the support coach engine 126 may generate a status notification indicating that all topic issues related to the customer care topic are discussed. The status notification may be generated for presentation to the CSR via a support application on a support terminal. However, if the support coach engine 126 determines that not all topic issues are discussed ("no" at decision block 506), the process 500 may proceed to block 510. At block 510, the support coach engine 126 may generate a reminder notification indicating that discussion of one or more topic issues related to the customer care topic are incomplete. The reminder notification may be generated for presentation to the CSR via a support application on a support terminal. The reminder notification may identify at least one topic issue of the customer care topic that has not yet been discussed by the CSR with the customer. Subsequently, the process 500 may loop back to block 502.

Figure 6:
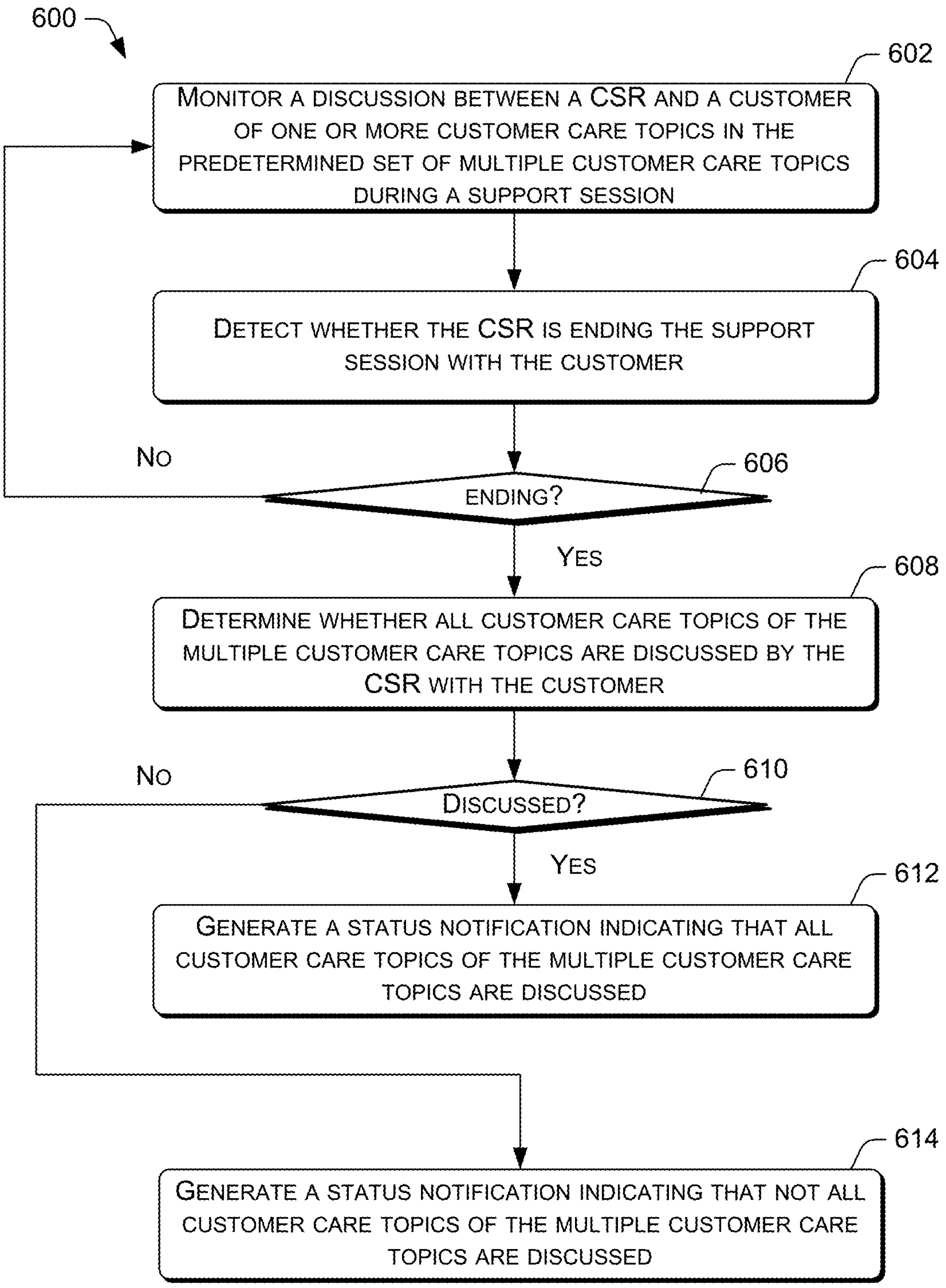
FIG. 6 is a flow diagram of an example process used by a support coach engine to ensure that all topics of a predetermined set of multiple customer care topics are discussed by a customer service representative with a customer.

FIG. 6 is a flow diagram of an example process 600 used by a support coach engine to ensure that all topics of a predetermined set of multiple customer care topics are discussed by a customer service representative with a customer. At block 602, the support coach engine 126 may monitor a discussion between a CSR and a customer of one or more customer care topics in the predetermined set of multiple customer care topics during a support session. In various embodiments, the support coach engine 126 may use NLP and/or speech-to-text techniques to extract words or phrases used during the discussion.

At block 604, the support coach engine 126 may detect whether the CSR is ending the support session with the customer. In some embodiments, the support coach engine 126 may use a keyword detection function to determine whether the CSR is ending, i.e., terminate a support session with a customer based on one or more keywords or phrases used by the CSR during the support session. In other embodiments, the support coach engine 126 may use a machine-learning algorithm to detect that the CSR is ending a support session. The machine-learning algorithm may use contextual characteristics of communications exchanged during a support session to arrive at a conclusion that the CSR is ending the support session.

At decision block 606, if the CSR is not ending the support session ("no" at decision block 606), the process 600 may loop back to block 602. However, if the CSR is ending the support session ("yes" at decision block 606), the process 600 may proceed to block 608. At block 608, the support coach engine 126 may determine whether all customer care topics of the multiple customer care topics are discussed by the CSR with the customer. At decision block 610, if all of the customer care topics are covered ("yes" at decision block 610), the process 600 may proceed to block 612. At block 612, the support coach engine 126 may generate a status notification indicating that all customer care topics of the multiple customer care topics are discussed. However, if not all of the customer care topics are covered ("no" at decision block 610), the process 600 may proceed to block 614. At block 614, the support coach engine 126 may generate a status notification indicating that not all customer care topics of the multiple customer care topics are covered.

Figure 7:
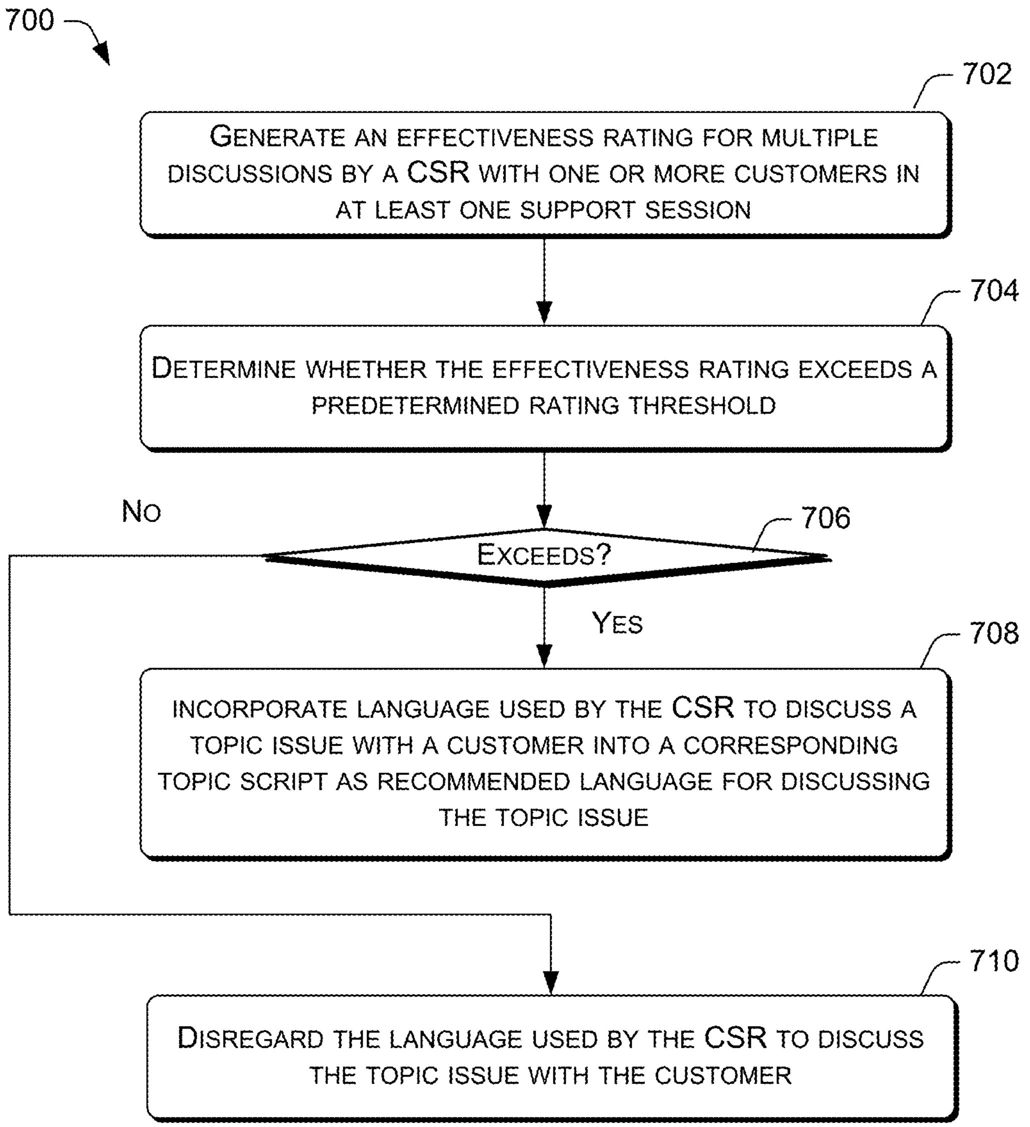
FIG. 7 is a flow diagram of an example process used by a support coach engine to incorporate language used by a customer service representative into a topic script for discussing a topic issue.

FIG. 7 is a flow diagram of an example process 700 used by a support coach engine to incorporate language used by a customer service representative into a topic script for discussing a topic issue. At block 702, the support coach engine 126 may generate an effectiveness rating for multiple discussions by a CSR with one or more customers in at least one support session. In various embodiments, the script modification module 222 may derive an effectiveness rating for the multiple support sessions based on feedback for the multiple support sessions during a predetermined period of time. At block 704, the support coach engine 126 may determine whether the effectiveness rating exceeds a predetermined rating threshold. At decision block 706, if the effectiveness rating exceeds the predetermined rating threshold ("yes" at decision block 706), the process 700 may proceed to block 708.

At block 708, the support coach engine 126 may incorporate language used by the CSR to discuss a topic issue with the customer into a corresponding topic script as recommended language discussing the topic issue. In various embodiments, the language may include a language unit (e.g., a phrase, a sentence, a paragraph, etc.) that is indicated by a dissimilarity score to be sufficiently different from the current language in the corresponding topic script for discussing the topic issue. However, if the effectiveness rating does not exceed the predetermined rating threshold ("no" at decision block 706), the process 700 may proceed to block 710. At block 710, the support coach engine 126 may disregard the language used by the CSR to discuss the topic issue with the customer.

Figure 8:
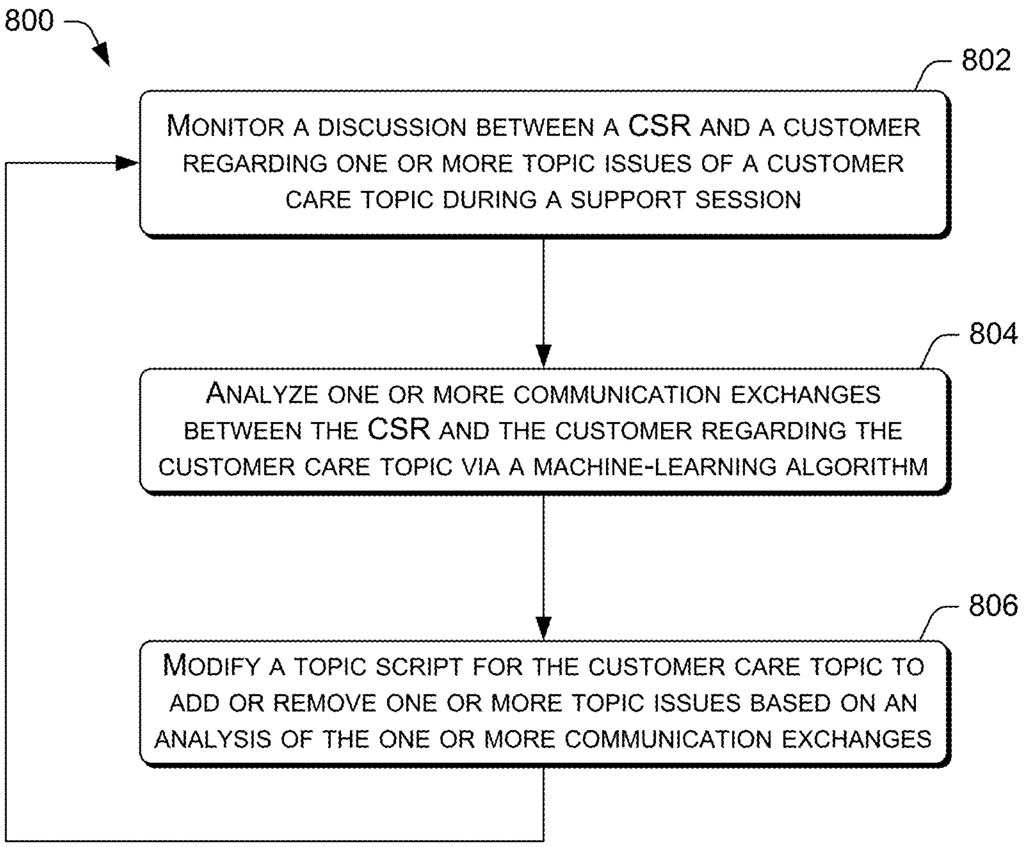
FIG. 8 is a flow diagram of an example process used by a support coach engine to modify a topic script by adding or deleting one or more topic issues.

FIG. 8 is a flow diagram of an example process 800 used by a support coach engine to modify a topic script by adding or deleting one or more topic issues. At block 802, the support coach engine 126 may monitor a discussion between a CSR and a customer regarding one or more topic issues of a customer care topic during a support session. In various embodiments, the support coach engine 126 may use NLP and/or speech-to-text techniques to extract word or phrases used during the discussion. At block 804, the support coach engine 126 may analyze one or more communication exchanges between the CSR and the customer regarding the customer care topic via a machine-learning algorithm. The machine-learning algorithm may include a machine-learning model that is trained using datasets that include a combination of language expressions, billing data, account status data, device diagnostic data, relevant network data, and/or relevant contextual data that are labeled with corresponding topic issues.

At block 806, the support coach engine 126 may modify a topic script for the customer care topic to add or remove one or more topic issues based on an analysis of the one or more communication exchanges via the machine-learning algorithm. For example, if the support coach engine 126 detects that a particular topic issue to be discussed is already covered or is rendered irrelevant by a discussion of another topic issue by the CSR with the customer, the support coach engine 126 may modify the topic script by removing the particular topic issue from the topic script. In another example, if the support coach engine 126 detects that a discussion of a particular topic issue by the CSR with the customers makes another topic issue that was not previously in the dynamic script relevant to a problem experienced by the customer, the support coach engine 126 may add the topic issue to the topic script. Subsequently, the process 800 may loop back to block 802 until the support session terminates.

The use of a support coach engine to ensure that a CSR discusses a predetermined set of customer care topics with a customer even when the customer contacts customer care of a wireless carrier network regarding less than all of the topics may significantly reduce the number of follow up voice call sessions or text chat sessions from the customer to customer care. For example, this may be due to additional problems faced by the customer being preemptively addressed in the same initial session. Accordingly, this approach may result in significant human, time, and infrastructure resource savings for the wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
- accessing, during a training data input phase of a model training algorithm, prior support interaction data that is associated with prior interactions between prior customers and prior customer service representatives;
- accessing, during the training data input phase of the model training algorithm, first datasets of the prior support interaction data;
- identifying, during a feature engineering phase of the model training algorithm, properties and relationships of the first datasets that aid a model to classify customers into customer categories and identify customer care topics;
- selecting, during a model generation phase of the model training algorithm, a machine learning algorithm;
- training, during the model generation phase of the model training algorithm, the model using the machine learning algorithm and the first datasets of the prior support interaction data;
- determining, during the model generation phase of the model training algorithm, that a first training error measurement of the model exceeds a training error threshold;
- based on determining that the first training error measurement of the model exceeds the training error threshold, selecting, via a rule engine and during the model generation phase of the model training algorithm, a different machine learning algorithm based on a magnitude of the first training error measurement;
- retraining, during the model generation phase of the model training algorithm, the model using the different machine learning algorithm and the first datasets of the prior support interaction data;
- determining, during the model generation phase of the model training algorithm, that a second training error measurement of the retrained model is below the training error threshold;

classifying a customer who is contacting customer care via a support session regarding a problem into a customer category of multiple customer categories based at least on customer account information of the customer;

based on determining that the second training error measurement of the retrained model is below the training error threshold, identifying a customer care topic in a predetermined set of multiple customer care topics that correspond to the problem using the retrained model;

retrieving or generating a topic script that corresponds to the customer category of the customer for the customer care topic in the predetermined set of customer care topics in which the topic script includes one or more topic issues related to the customer care topics; and providing the topic script for presentation to a customer service representative (CSR) to prompt the CSR to discuss the one or more topic issues related to the customer care topic with the customer.

2. The one or more non-transitory computer-readable media of claim 1, wherein:

selecting the machine learning algorithm comprises selecting the machine learning algorithm from among a support vector machine (SVM) algorithm, a gradient-boosted trees algorithm, and an artificial neural network, and selecting the different machine learning algorithm comprises selecting the different machine learning algorithm from among the SVM algorithm, the gradient-boosted trees algorithm, and the artificial neural network.

3. The one or more non-transitory computer-readable media of claim 1, wherein:

selecting the machine learning algorithm comprises selecting the machine learning algorithm from among a Bayesian algorithm, a decision tree algorithm, a support vector machine (SVM) algorithm, a gradient-boosted trees algorithm, a random forest algorithm, and an artificial neural network, and selecting the different machine learning algorithm comprises selecting the different machine learning algorithm from among the Bayesian algorithm, the decision tree algorithm, the support vector machine (SVM) algorithm, the gradient-boosted trees algorithm, the random forest algorithm, and the artificial neural network.

4. The one or more non-transitory computer-readable media of claim 1, wherein the acts further comprise:

retrieving or generating an additional topic script that corresponds to the customer category of the customer for an additional customer care topic in the predetermined set of multiple customer care topics in which the additional topic script includes one or more additional topic issues related to the additional customer care topic; and providing the additional topic script for presentation to the CSR to prompt the CSR to discuss the one or more additional topic issues related to the additional customer care topic with the customer.

5. The one or more non-transitory computer-readable media of claim 1, wherein the acts further comprise:

determining that discussion of the one or more topics related to the customer care topic by the CSR with the customer is completed;

based on determining that the discussion of the one or more topics related to the customer care topic by the CSR with the customer is completed, retrieving or generating an additional topic script; and providing the additional topic script for presentation to the CSR.

6. The one or more non-transitory computer-readable media of claim 1, wherein the acts further comprise:

generating an effectiveness rating for multiple discussions by the CSR with one or more customers in at least one support session; and in response to the effectiveness rating exceeding a predetermined rating threshold, incorporating language used by the CSR to discuss a topic issue with the customer into a corresponding topic script as recommended language for discussing the topic issue.

7. The one or more non-transitory computer-readable media of claim 1, wherein the acts further comprise:

determining that not all customer care topics in the predetermined set of multiple customer care topics are discussed by the CSR with the customer;

based on determining that not all customer care topics in the predetermined set of multiple customer care topics are discussed by the CSR with the customer, retrieving or generating an additional topic script; and providing the additional topic script for presentation to the CSR.

8. The one or more non-transitory computer-readable media of claim 1, wherein the acts further comprise:

generating a status notification indicating that discussion of at least one customer care topic in the predetermined set of multiple customer care topics is incomplete.

9. The one or more non-transitory computer-readable media of claim 1, wherein the acts further comprise:

determining whether all topic issues related to the customer care topic are discussed by the CSR with the customer; and in response to determining whether all topic issues are discussed by the CSR with the customer, generating a status notification indicating whether all topic issues related to the customer care topic are discussed.

10. A system, comprising:

one or more processors; and memory including a plurality of computer-executable components that are executable by the one or more processors to perform acts comprising:

accessing, during a training data input phase of a model training algorithm, prior support interaction data that is associated with prior interactions between prior customers and prior customer service representatives;

accessing, during the training data input phase of the model training algorithm, first datasets of the prior support interaction data;

identifying, during a feature engineering phase of the model training algorithm, properties and relationships of the first datasets that aid a model to classify customers into customer categories and identify customer care topics;

selecting, during a model generation phase of the model training algorithm, a machine learning algorithm;

training, during the model generation phase of the model training algorithm, the model using the machine learning algorithm and the first datasets of the prior support interaction data;

determining, during the model generation phase of the model training algorithm, that a first training error measurement of the model exceeds a training error threshold;

based on determining that the first training error measurement of the model exceeds the training error threshold, selecting, via a rule engine and during the model generation phase of the model training algorithm, a different machine learning algorithm based on a magnitude of the first training error measurement;

retraining, during the model generation phase of the model training algorithm, the model using the different machine learning algorithm and the first datasets of the prior support interaction data;

determining, during the model generation phase of the model training algorithm, that a second training error measurement of the retrained model is below the training error threshold;

classifying a customer who is contacting customer care via a support session regarding a problem into a customer category of multiple customer categories based at least on customer account information of the customer;

based on determining that the second training error measurement of the retrained model is below the training error threshold, identifying a customer care topic in a predetermined set of multiple customer care topics that correspond to the problem using the retrained model;

retrieving or generating a topic script that corresponds to the customer category of the customer for the customer care topic in the predetermined set of customer care topics in which the topic script includes one or more topic issues related to the customer care topics; and providing the topic script for presentation to a customer service representative (CSR) to prompt the CSR to discuss the one or more topic issues related to the customer care topic with the customer.

11. The system of claim 10, wherein:

selecting the machine learning algorithm comprises selecting the machine learning algorithm from among a support vector machine (SVM) algorithm, a gradient-boosted trees algorithm, and an artificial neural network, and selecting the different machine learning algorithm comprises selecting the different machine learning algorithm from among the SVM algorithm, the gradient-boosted trees algorithm, and the artificial neural network.

12. The system of claim 10, wherein:

selecting the machine learning algorithm comprises selecting the machine learning algorithm from among a Bayesian algorithm, a decision tree algorithm, a support vector machine (SVM) algorithm, a gradient-boosted trees algorithm, a random forest algorithm, and an artificial neural network, and selecting the different machine learning algorithm comprises selecting the different machine learning algorithm from among the Bayesian algorithm, the decision tree algorithm, the support vector machine (SVM) algorithm, the gradient-boosted trees algorithm, the random forest algorithm, and the artificial neural network.

13. The system of claim 10, wherein the acts further comprise:

retrieving or generating an additional topic script that corresponds to the customer category of the customer for an additional customer care topic in the predetermined set of multiple customer care topics in which the additional topic script includes one or more additional topic issues related to the additional customer care topic; and providing the additional topic script for presentation to the CSR to prompt the CSR to discuss the one or more additional topic issues related to the additional customer care topic with the customer.

14. The system of claim 10, wherein the acts further comprise:

determining that discussion of the one or more topics related to the customer care topic by the CSR with the customer is completed;

based on determining that the discussion of the one or more topics related to the customer care topic by the CSR with the customer is completed, retrieving or generating an additional topic script; and providing the additional topic script for presentation to the CSR.

15. The system of claim 10, wherein the acts further comprise:

generating an effectiveness rating for multiple discussions by the CSR with one or more customers in at least one support session; and in response to the effectiveness rating exceeding a predetermined rating threshold, incorporating language used by the CSR to discuss a topic issue with the customer into a corresponding topic script as recommended language for discussing the topic issue.

16. The system of claim 10, wherein the acts further comprise:

determining that not all customer care topics in the predetermined set of multiple customer care topics are discussed by the CSR with the customer;

based on determining that not all customer care topics in the predetermined set of multiple customer care topics are discussed by the CSR with the customer, retrieving or generating an additional topic script; and providing the additional topic script for presentation to the CSR.

17. The system of claim 10, wherein the acts further comprise:

generating a status notification indicating that discussion of at least one customer care topic in the predetermined set of multiple customer care topics is incomplete.

18. A computer-implemented method, comprising:

accessing, during a training data input phase of a model training algorithm, prior support interaction data that is associated with prior interactions between prior customers and prior customer service representatives;

accessing, during the training data input phase of the model training algorithm, first datasets of the prior support interaction data;

identifying, during a feature engineering phase of the model training algorithm, properties and relationships of the first datasets that aid a model to identify customer care topics;

selecting, during a model generation phase of the model training algorithm, a machine learning algorithm;

training, during the model generation phase of the model training algorithm, the model using the machine learning algorithm and the first datasets of the prior support interaction data;

determining, during the model generation phase of the model training algorithm, that a first training error measurement of the model exceeds a training error threshold;

based on determining that the first training error measurement of the model exceeds the training error threshold, selecting, via a rule engine and during the model generation phase of the model training algorithm, a different machine learning algorithm based on a magnitude of the first training error measurement;

retraining, during the model generation phase of the model training algorithm, the model using the different machine learning algorithm and the first datasets of the prior support interaction data;

determining, during the model generation phase of the model training algorithm, that a second training error measurement of the retrained model is below the training error threshold;

determining a problem presented by a customer who is contacting customer care;

determining, using the retrained model, a customer care topic that corresponds to the problem;

based on the customer care topic, generating a script; and providing the script to a customer service representative.

* * * * *